2,827,384
WATERPROOF COATINGS AND ADHESIVES

Helmut von Freyhold, Dusseldorf-Oberkassel, Germany, assignor to Philadelphia Quartz Company, Philadelphia, Pa., a corporation of Pennsylvania No Drawing. Application June 21, 1955
Serial No. 517,049

Claims priority, application Germany July 1, 1954

7 Claims. (Cl. 106—74)

This invention relates to improvements in waterproof coatings and adhesives particularly adapted for use in connection with fibrous material, such as paper.

Water-glass solutions have conventionally been used for coating or bonding fibrous materials such as paper and board, since, upon the removal of a small amount of water, they rapidly form a tough, strongly adherent film on or between the surfaces of the materials treated.

The removal of the water for the "setting" of the water-glass solutions may be effected in an extremely simple manner by evaporation and/or by absorption of the water into the material being coated or bonded. The coatings or bond formed from the water-glass solutions, however, have the disadvantage that they have a relatively low resistance to water.

Numerous attempts have been made to form waterproof adhesives and coatings from water-glass solutions, utilizing the known reaction of the alkali silicates, forming the water-glass solutions, with multivalent metal salts to form water insoluble metal silicates. These attempts, however, have not proven successful since the mixture of metal salts and water-glass used are relatively unstable and rapidly solidify. In order to overcome this disadvantage it has been suggested to maintain the water-glass solutions and the metal salts separate until actual use, as, for example, by impregnating one paper web with the metal salt as, for example, an aluminum salt while applying the water-glass solution to another paper web. The two webs pre-treated in this manner are then pasted together. This process is, however, cumbersome in practical operation. Additionally, the machinery used is subject to corrosion by the action of the metal salts as, for example, aluminum sulfate.

It has also been suggested to use water-glass solutions to which there have been added complex ammonium compounds of metals such as copper and zinc. Though it is possible to obtain stable solutions in this manner an excess of ammonia is required which results in a highly unpleasant odor. Furthermore the mixing of the components frequently results in difficulties due to premature gelling.

One object of this invention, is a water-glass containing coating or adhesive solution which may be easily set into a highly water-resistant coating or bond without the above-mentioned disadvantages. This and still further objects will become apparent from the following description:

In accordance with the invention it has been discovered that waterproof coatings and adhesives may be prepared without the above-mentioned disadvantages using water-glass solutions containing a complex compound of aluminum with an organic hydroxy acid or water soluble salt thereof. The water-glass solutions which may be used are those which have a mol ratio of $Na_2O:SiO_2$ within the range of from about 1:2.0 to 1:3.8 especially of 1:3.2 to 1:3.4. The concentrations of these water-glass solutions may vary from 30 to 60° Baumé. However, concentrations of 38–42° Baumé have proved most preferable.

The aluminum complex compounds which may be used in accordance with the invention may be any of the complex compounds or salts formed by aluminum with low-molecular hydroxy-carboxylic aliphatic acids such as citric acid, malic acid, lactic acid and preferably, tartaric acid, or a water soluble salt of the acid.

The aluminum complex compounds may be produced in the known manner, for example, by reacting the organic hydroxy acid or its water soluble salt with a solution of an aluminum salt such as aluminum sulfate, aluminum chloride, aluminum acetate, aluminum nitrate or alum. If the aluminum salt used in the preparation of the solution of the aluminum complex compound has an acid reaction, it has been found preferable to neutralize the solution of the aluminum complex compound prior to admixture with the water-glass. In this manner, any possible precipitation upon mixing with the water-glass or destruction of the colloidal structure of the water-glass during mixing is avoided.

For example, an aluminum salt, such as aluminum sulfate may be mixed with the organic hydroxy acid or its water soluble salt as, for example, with tartaric acid, and the solution of the aluminum complex compound thereby obtained, neutralized. This neutralization may be effected by addition of KOH, NaOH, carbonate of sodium, or potash. The organic hydroxy acid to be used should be employed in at least stoichiometric proportion, preferably however, in excess relative to the added aluminum salt. The neutralized solution is then mixed with a water-glass solution. The resulting mixture may be used for coating or bonding materials such as paper, board, or the like, in the identical manner as conventionally involved in the use of water-glass solutions alone.

By using the aluminum salts in their complex form as described, the precipitation of aluminum hydroxide or silicate in the water-glass solution is avoided and the mixture obtained is entirely clear and stable without the adhesive power of the water-glass being detrimentally influenced.

It is only after the setting of the solution to form the bond or coating which is effected in the conventional manner by heating as, for example, by passage of the paper web over heated rolls, that the addition of the aluminum compound makes its presence felt, rendering the coating or bond obtained extremely water proof.

The quantities of the complex aluminum compounds which may be added, in accordance with the invention, need not be large and generally additions of about 0.5–2% by weight will suffice.

Thus, for example, a corrugated paper bonded with a water-glass solution containing about 0.5% aluminum sulfate and 0.5% tartaric acid is stable upon standing in tap water at room temperature for more than 48 hours.

The water-glass solutions, in accordance with the invention, in addition to the advantages of simplicity of use on the one hand, and lack of odor as compared with water-glass solutions containing ammonium complex compounds, on the other hand, also have the advantage that the undesired discolorations which frequently occur when water-glass is used as an adhesive are for all practical purposes avoided.

The water-glass solutions, in accordance with the invention, may contain any additional materials conventionally used with water-glass solutions, as, for example, starch, starch products, synthetic resins, or the like. The clays which are frequently mixed with conventional water-glass for technical reasons may be added to the water-glass mixture, in accordance with the invention, and extremely water-resistant and excellent bonds and coatings are obtained. Instead of clay also other substances such as bentonite or diatomaceous earth may be used. The amounts of the said additions lie within the range of about 5–30% by weight, preferably 10–20% by weight.

The following examples are given by way of illustration and not limitation:

Example 1

490 grams of aluminum sulfate (crystalline) and 300 grams sodium tartrate are dissolved in 1 liter of water and thereupon 600 cc. of 20% caustic soda solution are added in order to neutralize the solution. The solution is thereupon slowly stirred into 50 grams of water-glass solution at 38.5° Baumé. A clear resultant solution which is stable upon storage is obtained. The bond of a corrugated cardboard of soda kraft paper (180 to 200 grams per cubic meter) bonded with this water-glass solution is resistant upon standing in tap water at room temperature for more than 48 hours.

Example 2

12% by weight of kaolin is incorporated in the water-glass mixture of Example 1. The mixture thus obtained is suitable for coating and bonding highly absorbent papers and cardboards forming waterproof coatings and bonds. The mixture may also be used for coating and bonding papers subject to discoloration due to penetration of the coating or bonding solution when conventional silicate adhesives are employed. My adhesives cause no discoloration.

I claim:

1. A silicate coating and adhesive composition comprising an aqueous sodium silicate solution having a ratio of $Na_2O$ to $SiO_2$ ranging from about 1:2 to 1:3.4 and a gravity ranging from about 30° to 60° Baumé and containing from about 0.5 to 2% by weight of a complex water-soluble aluminum salt of a low-molecular hydroxy-carboxylic aliphatic acid, whereby the bond produced by the composition is resistant to water.

2. The composition of claim 1 wherein the aluminum salt is aluminum tartrate.

3. The composition of claim 1 wherein the aluminum salt is aluminum citrate.

4. The composition of claim 1 wherein the aluminum salt is aluminum lactate.

5. The composition of claim 1 wherein from about 5 to 30% by weight of clay is present in said composition.

6. A silicate coating and adhesive composition comprising an aqueous solution of sodium silicate having a ratio of $Na_2O$ to $SiO_2$ within the range of from about 1.32 to 1.34 and a gravity ranging from about 38° to 42° Baumé and containing from about 0.5 to 2% of a complex water-soluble aluminum salt of a low-molecular aliphatic hydroxy-carboxylic acid.

7. In the manufacture of silicate adhesive compositions capable of producing water-resistant bonds the process which comprises preparing an aqueous solution of a complex salt of aluminum with a low-molecular aliphatic hydroxy-carboxylic acid, neutralizing said solution and then adding a small amount to an aqueous solution of sodium silicate having a ratio of $Na_2O$ to $SiO_2$ ranging from about 1:2 to 1:3.8 and a gravity ranging from about 30° to 60° Baumé.

References Cited in the file of this patent

UNITED STATES PATENTS

| | | |
|---|---|---|
| 2,004,545 | Wolf et al. | June 11, 1935 |
| 2,181,811 | Hughes | Nov. 28, 1939 |
| 2,350,688 | Licata | June 6, 1944 |
| 2,554,035 | Kreyling | May 22, 1951 |
| 2,559,553 | Hotten | June 10, 1952 |

UNITED STATES PATENT OFFICE

CERTIFICATE OF CORRECTION

Patent No. 2,827,384                                March 18, 19

Helmut von Freyhold

It is hereby certified that error appears in the printed specificat of the above numbered patent requiring correction and that the said Lett Patent should read as corrected below.

Column 1, line 35, for "mixture" read -- mixtures --; column 3, lin 15, for "50 grams" read -- 50 kilograms --; column 4, line 16, claim 6, for "1.32 to 1.34" read -- 1:32 to 1:3.4 --.

Signed and sealed this 21st day of October 1958.

(SEAL)
Attest:
KARL H. AXLINE
Attesting Officer

ROBERT C. WATSO
Commissioner of Pate

UNITED STATES PATENT OFFICE

CERTIFICATE OF CORRECTION

Patent No. 2,827,384                                            March 18, 1958

Helmut von Freyhold

It is hereby certified that error appears in the printed specification of the above numbered patent requiring correction and that the said Letters Patent should read as corrected below.

Column 1, line 35, for "mixture" read -- mixtures --; column 3, line 15, for "50 grams" read -- 50 kilograms --; column 4, line 16, claim 6, for "1.32 to 1.34" read -- 1:3.2 to 1:3.4 --.

This certificate supersedes Certificate of Correction issued October 21, 1958.

Signed and sealed this 13th day of January 1959.

(SEAL)

Attest:

KARL H. AXLINE                                             ROBERT C. WATSON

Attesting Officer                                         Commissioner of Patents